(12) United States Patent
Miyamoto et al.

(10) Patent No.: US 9,729,027 B2
(45) Date of Patent: Aug. 8, 2017

(54) COOLING STRUCTURE OF ROTARY ELECTRIC MACHINE

(75) Inventors: Tomohiko Miyamoto, Toyota (JP); Shuhei Matsusaka, Toyoake (JP); Koji Kato, Anjo (JP)

(73) Assignees: TOYOTA JIDOSHA KABUSHIKI KAISHA, Aichi-ken (JP); AISIN AW CO., LTD., Aichi-ken (JP)

( * ) Notice: Subject to any disclaimer, the term of this patent is extended or adjusted under 35 U.S.C. 154(b) by 521 days.

(21) Appl. No.: 14/126,019

(22) PCT Filed: Jun. 22, 2012

(86) PCT No.: PCT/IB2012/001236
§ 371 (c)(1),
(2), (4) Date: Dec. 13, 2013

(87) PCT Pub. No.: WO2012/176052
PCT Pub. Date: Dec. 27, 2012

(65) Prior Publication Data
US 2014/0125165 A1    May 8, 2014

(30) Foreign Application Priority Data
Jun. 24, 2011 (JP) .................. 2011-140272

(51) Int. Cl.
*H02K 9/19* (2006.01)
*H02K 1/32* (2006.01)
(52) U.S. Cl.
CPC .............. *H02K 9/19* (2013.01); *H02K 1/32* (2013.01); *H02K 2209/00* (2013.01)

(58) Field of Classification Search
CPC ............ H02K 9/00; H02K 9/005; H02K 9/19; H02K 9/193
(Continued)

(56) References Cited

U.S. PATENT DOCUMENTS

| | | | | |
|---|---|---|---|---|
| 3,648,085 A | * | 3/1972 | Fujii | ........................ H02K 9/19 310/54 |
| 4,376,902 A | * | 3/1983 | Soussa | ..................... H02K 9/20 310/54 |

(Continued)

FOREIGN PATENT DOCUMENTS

| | | |
|---|---|---|
| JP | 09-154257 A | 6/1997 |
| JP | 2001-095205 A | 4/2001 |

(Continued)

OTHER PUBLICATIONS

Machine translation of JP 2007159325 A.*

*Primary Examiner* — John K Kim
*Assistant Examiner* — Minki Chang
(74) *Attorney, Agent, or Firm* — Sughrue Mion, PLLC

(57) ABSTRACT

A cooling structure of a rotary electric machine (10) that includes a rotating shaft (16), a rotor (18), and a stator (20) that includes a coil end (22), includes a coolant passage (38) that is included in the rotating shaft (16) and through which coolant flows, and a squirt hole (42) that is included in the coolant passage (38). The squirt hole (42) is included in the coolant passage (38). An opening portion of the squirt hole (42) is positioned on an outer peripheral surface of the rotating shaft (16) and to an outside of the coil end (22) in the axial direction. The squirt hole (42) squirts the coolant such that the coolant is distributed to an inner peripheral surface (C1, C2) of the coil end (22) and an end surface (A1, A2) of the coil end (22) in the axial direction.

5 Claims, 2 Drawing Sheets

(58) Field of Classification Search
USPC ....... 310/52, 53, 54, 58, 60 R, 60 A, 61, 62, 310/63
See application file for complete search history.

(56) References Cited

U.S. PATENT DOCUMENTS

| | | | | |
|---|---|---|---|---|
| 5,509,381 | A | * 4/1996 | Fisher | .................... F01M 9/108 123/196 R |
| 5,682,074 | A | * 10/1997 | Di Pietro | ........... B22D 19/0054 310/211 |
| 7,834,492 | B2 | * 11/2010 | Iund | ........................ H02K 5/20 310/52 |
| 2009/0267428 | A1 | 10/2009 | Nakahara et al. | |
| 2012/0299404 | A1 | * 11/2012 | Yamamoto | ........... H02K 1/2766 310/61 |

FOREIGN PATENT DOCUMENTS

| | | | |
|---|---|---|---|
| JP | 2007-159325 | A | 6/2007 |
| JP | 2007159325 | A * | 6/2007 |
| JP | 2007-312569 | A | 11/2007 |
| JP | 2009-081953 | A | 4/2009 |
| JP | 2009-284756 | A | 12/2009 |
| JP | 2010-130794 | A | 6/2010 |

\* cited by examiner

COOLING STRUCTURE OF ROTARY ELECTRIC MACHINE

BACKGROUND OF THE INVENTION

1. Field of the Invention

The invention relates to a cooling structure of a rotary electric machine.

2. Description of Related Art

As a rotary electric machine such as an electric motor for a vehicle, a structure that includes a rotor that is fixed to a rotating shaft, and a stator that faces an outer periphery of the rotor is known. When this rotary electric motor is used, a stator coil provided in the stator may generate heat. One way to deal with this heat generation is to supply coolant (such as cooling oil) that is a cooling medium to the stator coil.

For example, Japanese Patent Application Publication No. 2001-95205 (JP 2001-95205 A) describes a rotary electric machine that includes a rotor that is fixed to a rotating shaft, and a stator that faces an outer periphery of the rotor. In the rotary electric machine, a center hole is provided in an axial direction in the center of the rotating shaft. Also, a through-hole is provided from the center hole toward the radial direction, and a tip end of a conduit through which coolant flows is inserted into the center hole. The coolant that flows into the center hole is sprayed from the through-hole toward a stator coil end and strikes the radially inside of the stator coil end, such that the stator coil end is cooled by the coolant.

With the structure described in JP 2001-95205 A, coolant that has been squirted out from the through-hole provided in the rotating shaft strikes the inner peripheral surface of the coil end. That is, coolant is only applied to a narrow area in the inner peripheral surface of the coil end. Therefore, a temperature difference between a low temperature portion and a high temperature portion of the coil end is large. Thus, there is a room for improvement in an efficient reduction of the high temperature portion. On the other hand, it is possible to provide a plurality of squirt holes for squirting coolant toward a surface other than the inner peripheral surface of the coil end. However, in this case, the number of the plurality of squirt holes increases, and the structure becomes complicated, which may lead to an increase in cost. For the above reason, it is desired that temperature variation at the coil end is suppressed by a relatively simple structure to expand the cooling area of the coil end.

SUMMARY OF THE INVENTION

Thus, the invention provides a cooling structure of a rotary electric machine that expands a cooling area of a coil end by a relatively simple structure.

One aspect of the invention relates to a cooling structure of a rotary electric machine that includes a rotating shaft, a rotor provided on the rotating shaft, and a stator that faces an outer periphery of the rotor and includes a coil end that is provided in an end portion of the stator in an axial direction of the rotating shaft. This cooling structure includes a coolant passage that is included in the rotating shaft and through which coolant flows, and a squirt hole that squirts the coolant such that the coolant is distributed to an inner peripheral surface of the coil end and an end surface of the coil end in the axial direction. Also, the squirt hole is included in the coolant passage. An opening portion of the squirt hole is positioned on an outer peripheral surface of the rotating shaft and is positioned to an outside of the coil end in the axial direction.

In the aspect of the invention, the squirt hole may be angled with respect to a direction orthogonal to the rotating shaft.

In the aspect of the invention, the squirt hole may point toward a corner portion where the inner peripheral surface of the coil end meets the end surface of the coil end.

According to the cooling structure of a rotary electric machine of the aspect of the invention, coolant that strikes the coil end is distributed to both the inner peripheral surface of the coil end and the end surface of the coil end in the axial direction. Accordingly, both the inner peripheral surface of the coil end and the end surface of the coil end in the axial direction are cooled by coolant squirted out from a single squirt hole. Therefore, the cooling area of the coil end is expanded and temperature variation at the coil end is suppressed by a relatively simple structure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment of the invention will be described with reference to FIGS. 1 and 2. The cooling structure of a rotary electric machine of this example embodiment may be applied to a motor for running, a generator, or a motor-generator. A motor for running, a generator, or a motor-generator is used in an electric vehicle, a fuel cell vehicle, and a hybrid vehicle, for example. Also, when the rotary electric machine is used as a motor-generator, the rotary electric machine may be used primarily as a generator, or primarily as a motor for running.

Figure 1:
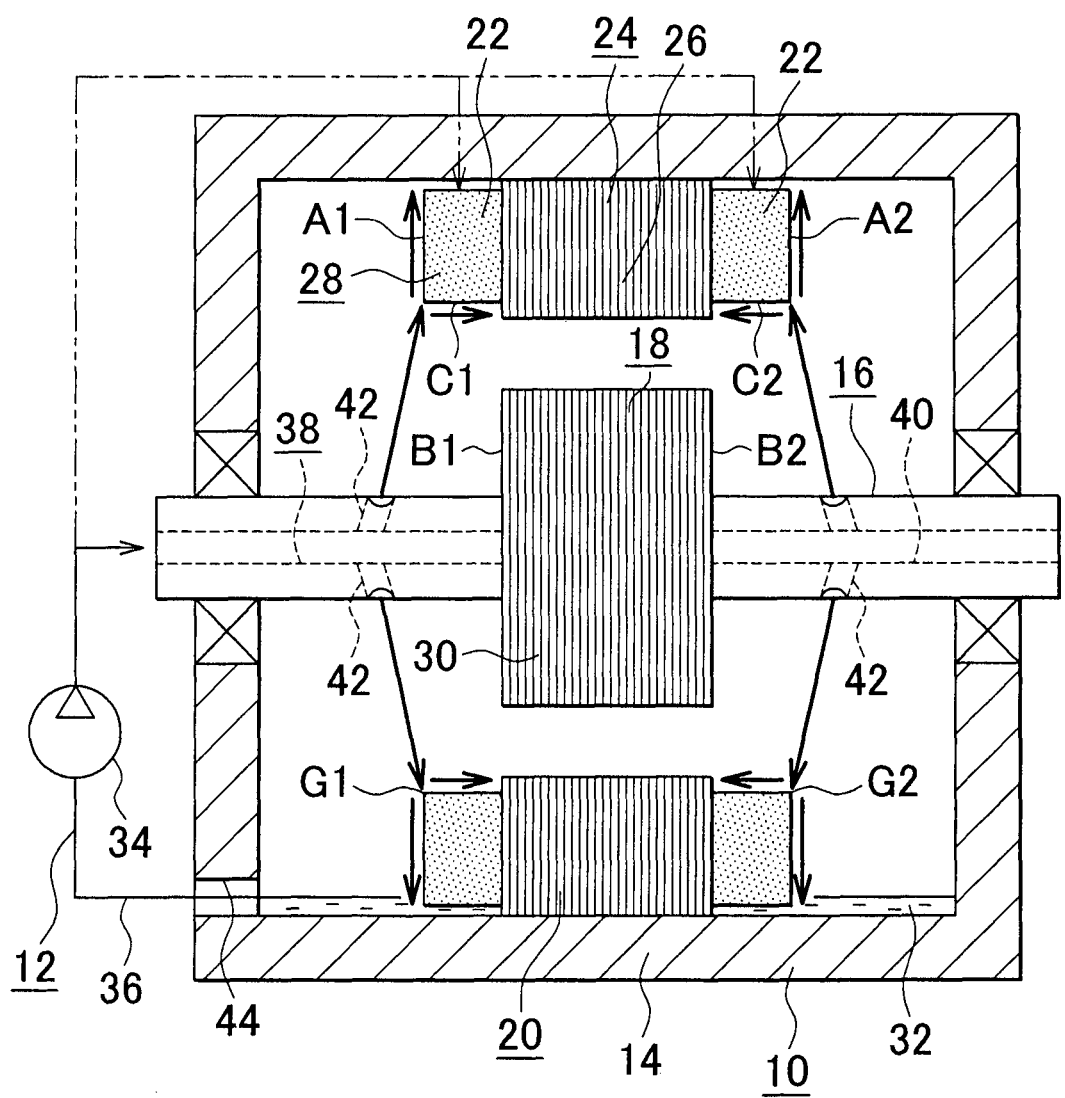
FIG. 1 is a sectional view schematically showing a cooling structure of a rotary electric machine according to an example embodiment of the invention.

FIG. 1 is a sectional view schematically showing the cooling structure of a rotary electric machine according to the example embodiment. As shown in FIG. 1, the cooling structure of a rotary electric machine includes a rotary electric machine 10 and a cooling portion 12 that cools the rotary electric machine 10. The rotary electric machine 10 includes a motor case 14, a rotating shaft 16, a rotor 18, and a stator 20. The stator 20 and the rotor 18 are housed in the motor case 14. The rotating shaft 16 is rotatably supported via bearings. The rotor 18 is fixed to a middle portion of the rotating shaft 16. The stator 20 is provided facing the outer periphery of the rotor 18. There is an air gap between the rotor 18 and the stator 20. Also, the stator 20 is fixed to an inner peripheral surface of the motor case 14. Coil ends 22 are provided on the stator 20. Oil that is a cooling medium, i.e., coolant, is supplied to the coil ends 22 to cool the coil ends 22.

The stator 20 is formed by a plurality of magnetic steel sheets laminated together in an axial direction of the rotating shaft 16 (hereinafter, also referred to simply as the "axial direction"). The stator 20 includes a stator core 24, teeth 26, and a stator coil 28. The stator core 24 is formed by a magnetic member with a laminated body or the like. The teeth 26 are formed in a plurality of locations in the circumferential direction on the inner peripheral surface of the stator core 24. Also, the teeth 26 protrude in the radial direction of the stator core 24. The stator coil 28 with a plurality of phases (such as three phases, for example) is wound around the teeth 26. The stator coil 28 includes the pair of the coil ends 22. The coil ends 22 protrude to the outsides from both side surfaces of the stator core 24 in the axial direction. That is, the coil end 22 is provided with an end portion of the stator 20 in the axial direction of the rotating shaft 16. The stator core 24 is fixed to the inside surface of the motor case 14. The stator coil 28 is wound around the stator core 24 in a concentrated winding or a distributed winding.

The rotor 18 includes a rotor core 30 and permanent magnets, not shown. The rotor core 30 is formed by a magnetic member with a laminated body or the like which includes a plurality of magnetic steel sheets laminated together in the axial direction. The permanent magnets are arranged in a plurality of locations in the circumferential direction of the rotor core 30. The permanent magnets are magnetized in the radial direction of the rotor 18 or in a direction at an angle with respect to the radial direction. A pair of end plates, not shown, may also be provided one on each side of the rotor core 30 in the axial direction. Both sides of the rotor core 30 may be sandwiched by this pair of end plates.

Also, in the example shown, the length of the stator 20 in the axial direction is greater than the length of the rotor 18 in the axial direction. Therefore, end surfaces A1 and A2 of the coil ends 22 in the axial direction are provided to the outsides of end surfaces B1 and B2 of the rotor 18 in the axial direction. In this example embodiment, the position that is relatively far from the center of the rotor 18 in the axial direction is the "outside in the axial direction". That is, "opening portions of squirt holes are positioned to an outside of the coil end in the axial direction" means "opening portions of squirt holes are positioned farther from the center of the rotor in the axial direction than the coil end"

With this kind of rotary electric machine 10, a rotating magnetic field is generated in the stator 20 by flowing a plurality of phases of alternating current to the stator coil 28 of a plurality of phases. This rotating magnetic field causes the rotor 18 to rotate together with the rotating shaft 16. In the description above, a case in which the rotary electric machine 10 is a permanent-magnet rotary electric machine is described. However, the rotary electric machine 10 may also be an induction motor by providing a rotor coil in the rotor 18, for example.

Also, a reservoir portion 32 that accumulates serving as coolant oil, such as lubricant oil, is provided inside of a lower portion of the motor case 14. Oil accumulated in the reservoir portion 32 is supplied to the rotating shaft 16 by an oil pump 34. The oil pump 34 is included in a cooling portion 12. The cooling portion 12 also includes an oil passage 36. The oil passage 36 is a connecting passage through which oil flows from the reservoir portion 32 to the oil pump 34. The oil pump 34 is provided in the oil passage 36. The oil pump 34 is driven by a power supply that is not shown, and draws up oil from the reservoir portion 32 and supplies the oil to the rotary electric machine 10.

Further, a shaft side coolant passage 38 is provided inside of the rotating shaft 16. This shaft side coolant passage 38 serves as a coolant passage of the invention. Oil that is coolant flows through this shaft side coolant passage 38. The shaft side coolant passage 38 includes an axial passage 40 and a plurality of squirt holes 42. The axial passage 40 is provided on the center axis inside of the rotating shaft 16. A plurality of the squirt holes 42 are communicated with the axial passage 40. In this example embodiment, the squirt holes 42 are provided in two different locations in the axial direction. These squirt holes 42 are positioned to the outsides of the coil ends 22 in the axial direction. These squirt holes 42 extend at angles to the direction orthogonal to the rotating shaft 16. The squirt holes 42 are linearly formed. The inside ends of squirt holes 42 in the radial direction of the rotating shaft 16 are connected to the axial passage 40 (hereinafter, simply referred to as the "radial direction"). Here, the term "radial direction" refers to a direction that is orthogonal to the center axis of the rotating shaft 16. The opening portions of the squirt holes 42 are positioned to the outer peripheral surface of the rotating shaft 16. That is, the rotating shaft 16 is rotatably provided and includes the shaft side coolant passage 38. Also, the shaft side coolant passage 38 has the opening portions of the plurality of squirt holes 42 that are positioned to the outsides of the coil ends 22 in the axial direction.

Corner portions G1 and G2 are portions where inner peripheral surfaces C1 and C2 of the coil ends 22 meet end surfaces A1 and A2 of the coil ends 22 in the axial direction. The squirt holes 42 are provided pointing toward the corner portions G1 and G2. Therefore, coolant squirted out from the squirt holes 42 strikes the coil ends 22 and is distributed to both the inner peripheral surfaces C1 and C2 of the coil ends 22 and the end surfaces A1 and A2 of the coil ends 22 in the axial direction.

A downstream end of the oil passage 36 is inserted into the shaft side coolant passage 38. Oil is supplied from the oil passage 36 to the shaft side coolant passage 38 regardless of whether the rotating shaft 16 is rotating. Here, an outlet 44 is provided in a lower portion of the motor case 14. The outlet 44 is connected to an upstream end of the oil passage 36. That is, the oil passage 36 connects the lower portion of the motor case 14 with the shaft side coolant passage 38. An opening in an end portion (the right end portion in FIG. 1) of the shaft side coolant passage 38 on the side opposite the side that is connected to the oil passage 36 is closed off by a plug member, not shown. Also, the oil that serves as the cooling medium may be lubricating oil for a transmission, such as automatic transmission fluid (ATF), for example.

Also, a water jacket 46 (FIG. 2) may also be provided in the inside of or the outside of a bottom portion of the motor case 14. Coolant such as antifreeze may flow through the water jacket 46. That is, the water jacket 46 is a passage for coolant that cools the motor. The water jacket 46 is connected to a coolant passage, not shown, outside the motor case 14. A heat exchanger, not shown, is provided with the coolant passage. Coolant is cooled by heat exchange with air, which flows through the outside of the motor case 14, at the heat exchanger. FIG. 2 is a view showing a frame format of the manner in which the rotary electric machine 10 is cooled by oil (ATF) 48 in this example embodiment. In this case, as shown in FIG. 2, the rotary electric machine 10 that is referred to as "MG" is cooled by the ATF 48. The ATF 48 is cooled in the motor case 14. The motor case 14 is cooled by the water jacket 46. The water jacket 46 is cooled by coolant 50.

In FIG. 1, oil discharged from the outlet 44 to the oil passage 36 may also be cooled in an oil pan or the like. Also, the oil may be cooled at a heat exchange portion that performs heat exchange between the oil and outside air (or coolant). Oil that has been cooled in this way may be supplied to the shaft side coolant passage 38.

Also, the temperature of the coil ends 22 may be detected by a temperature sensor, not shown, provided at a portion around one or both of the pair of coil ends 22.

With this kind of cooling structure of a rotary electric machine, oil is supplied from the oil reservoir portion 32 to the shaft side coolant passage 38 by the oil pump 34 being driven. Then, the oil is squirted out in a direction toward the corner portions G1 and G2 of the coil ends 22. That is, the oil is squirted in an oblique direction that is inclined toward the axial center of the stator 20 in a direction toward the radially outside.

The oil that strikes the corner portions G1 and G2 of the coil ends 22 is distributed to both the inner peripheral surfaces C1 and C2 of the coil ends 22 and the end surfaces A1 and A2 of the coil ends 22 in the axial direction. That is, the oil flows toward center of the stator 20 in the axial direction along the inner peripheral surfaces C1 and C2 of the coil ends 22. In addition, oil also flows radially outward along the axial end surfaces A1 and A2 of the coil ends 22. The oil that has flowed along the inner peripheral surfaces C1 and C2 and the oil that has flowed along the axial end surfaces A1 and A2 drips down toward the reservoir portion 32. The oil accumulated in the reservoir portion 32 is drawn up by the oil pump 34 and discharged toward the shaft side coolant passage 38 of the rotating shaft 16. Oil repeatedly flows through the rotary electric machine 10 in the manner described above. As a result, the coil ends 22 of the stator 20 are cooled.

According to the cooling structure of the rotary electric machine described above, the opening portions of the squirt holes 42 are positioned farther to the outside in the axial direction than the coil ends 22. Also, the oil that strikes the coil ends 22 is distributed to both the inner peripheral surfaces C1 and C2 of the coil ends 22 and the end surfaces A1 and A2 of the coil ends 22 in the axial direction. That is, both the inner peripheral surface C1 (or C2) of one coil end 22 and the end surface A1 (or A2) of the one coil end 22 in the axial direction are directly cooled by oil that is squirted out from a single squirt hole 42. Accordingly, the cooling area of the coil ends 22 is expanded by a relatively simple structure, without using excess of squirt passages. As a result, temperature variation at the coil ends 22 is suppressed.

Figure 3:
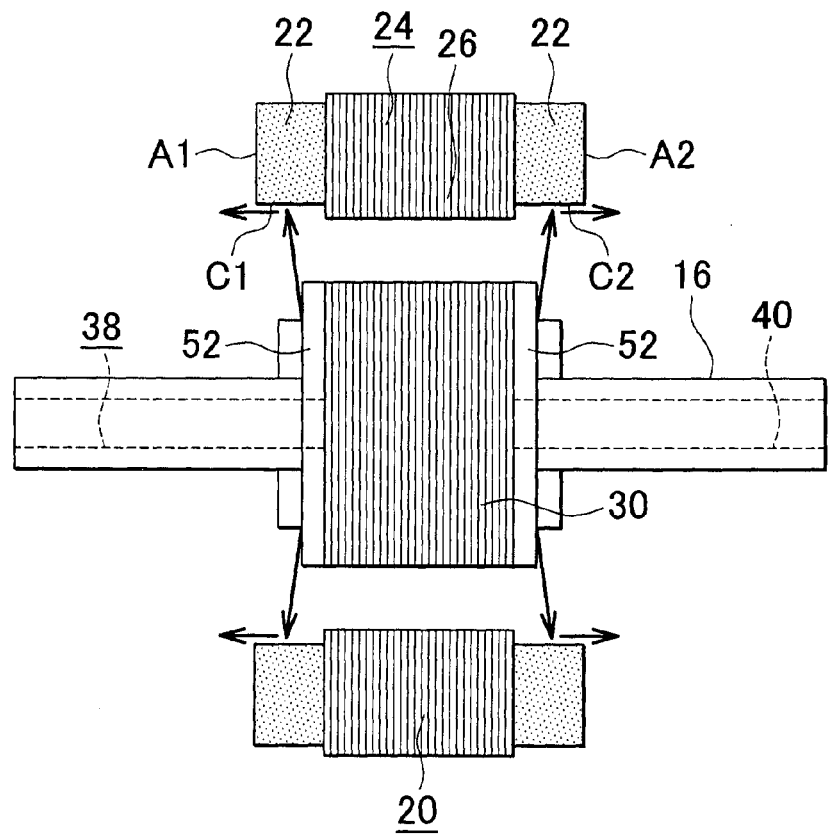
FIG. 3 is a view of a cooling structure of a rotary electric machine according to a comparative example.

FIG. 3 is a view of a cooling structure of a rotary electric machine according to a comparative example. In FIG. 3, the motor case 14 and the oil passage 36 outside of the motor case 14 that are shown in FIG. 1 are omitted. In the comparative example in FIG. 3, a rotor core 30 is externally fitted to a rotating shaft 16. A pair of end plates 52 are provided one on each side of the rotor core 30 in the axial direction. Both sides of the rotor core 30 are sandwiched by the pair of end plates 52. A rotor side coolant passage, not shown, is provided inside of each end plate 52.

A shaft side coolant passage 38 is provided on a center axis inside the rotating shaft 16. The shaft side coolant passage 38 includes an axial passage 40. Also, a plurality of radial passages (not shown) extends radially from two different locations of the axial passage 40 in the axial direction. One end of each radial passage is positioned on an outer peripheral surface of the rotating shaft 16. Then, the one end of each radial passage is communicated with one end of each rotor side coolant passage that is formed inside each end plate 52. The other end of each rotor side coolant passage is positioned on an outer peripheral surface of the end plate 52. This other end of each rotor side coolant passage is positioned farther to the inside in the axial direction than end surfaces A1 and A2 of the coil ends 22 in the axial direction. Here, the inside in the axial direction refers to the center side of the rotor in the axial direction. Therefore, oil that serves as coolant supplied to the shaft side coolant passage 38 is squirted out from the outer peripheral surfaces of the end plates 52 toward the inner peripheral surfaces of the coil ends 22. This oil that has been squirted out flows outward in the axial direction along the inner peripheral surfaces of the coil ends 22, and then drips down.

In this comparative example, oil that has been squirted out from the inside of the rotating shaft 16 through the end plates 52 strikes the inner peripheral surfaces C1 and C2 of the coil ends 22, i.e., a narrow area of the coil ends 22. Therefore, the oil is only applied to the inner peripheral surfaces of the coil ends 22. On the other hand, oil is not applied to the end surfaces A1 and A2 of the coil ends 22 in the axial direction. Thus, the temperature difference between a low temperature portion and a high temperature portion of the coil ends 22 becomes large, such that temperature variation tends to occur. Therefore, the outer peripheral surfaces of coil ends 22, on which the temperature sensor is usually mounted, tends to overheat. Accordingly, there is room for improvement in efficient reduction of the outer peripheral surfaces temperature of coil end 22. For the above reason, in this comparative example, it is desired that temperature variation at the coil ends 22 is suppressed by a relatively simple structure to expand the cooling area of the coil ends 22.

Figure 2:
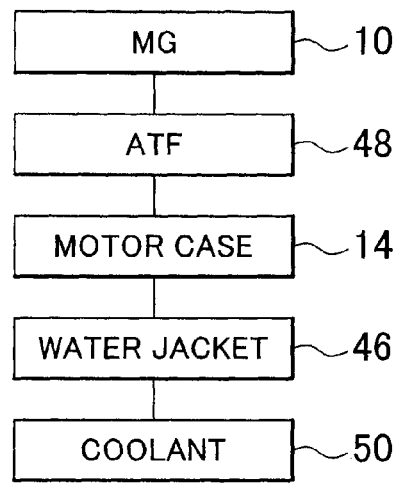
FIG. 2 is a view showing a frame format of the manner in which the rotary electric machine is cooled by oil in the example embodiment of the invention.

In contrast, with the cooling structure of a rotary electric machine according to the example embodiment shown in FIGS. 1 and 2, coolant that strikes the coil ends 22 is distributed to both the inner peripheral surfaces of the coil ends 22 and the end surfaces of the coil ends 22 in the axial direction. Therefore, oil efficiently strikes a broad area of the coil ends 22 by a relatively simple structure such that temperature variation at the coil ends 22 is suppressed. Accordingly, the temperature of the outer peripheral surfaces of the coil ends 22 that tends to become high is lowered. Thus, an area for mounting the temperature sensor may widen. Also, the amount of oil necessary to lower the temperature of the stator 20 is less, so the driving force of the oil pump 34 is reduced. Thus, the fuel consumption of the vehicle is decreased. Furthermore, because the temperature of the stator coil 28 when the rotary electric machine 10 is used is lower, the necessary performance for rotary electric machine 10 is maintained even when the insulation performance of the stator coil 28 is less stringent (i.e., is reduced). Thus, the voltage-resistance performance of the rotary electric machine 10 is increased, so the performance of the rotary electric machine 10 may be improved.

Centrifugal force acts on the oil that is squirted out from the squirt holes 42 as the rotating shaft 16 rotates. The opening area and angle and the like of the squirt holes 42 may be such that the oil that is squirted out strikes the corner portions G1 and G2 of the coil ends 22, despite a rotation speed of the rotary electric machine 10. However, the oil that has been squirted out from the squirt holes 42 may also be made to strike the corner portions G1 and G2 of the coil ends 22 only within a specified rotation speed range of the rotary electric machine 10. Also, the oil is not limited to being squirted out linearly, as shown in FIG. 1. The oil may also be squirted out on a flare trajectory. That is, the cooling structure of the invention applies to a mode in which oil that has been squirted out from the squirt holes 42 strikes the corner portions G1 and G2 of the coil ends 22.

Also, in the example embodiment shown in FIG. 1, oil discharged from the oil pump 34 may also be squirted out toward upper surfaces of the coil ends 22 from an upper side of the motor case 14, as shown by the alternate long and two short dashes line in FIG. 1. Oil may also be supplied to the shaft side coolant passage 38 of the rotating shaft 16. The oil drips down from the upper side of the motor case 14 to the upper surfaces of the coil ends 22 and cools the upper surfaces of the coil ends 22. In this case as well, the inner peripheral surfaces C1 and C2 of the coil ends 22 and the end surfaces A1 and A2 of the coil ends 22 in the axial direction are cooled such that an amount of the oil that is squirted from upside of coil ends 22 is reduced. Accordingly, operation and effects similar to those of the example embodiment described above are also able to be obtained.

Also, a shifting mechanism such as a planetary gear set, or a rotor and stator of another rotary electric machine may also be provided in the motor case 14. For example, a transaxle case that forms a transaxle unit that is a power generating mechanism of a hybrid vehicle may also be made to function as a motor case.

Also, in the example embodiment shown in FIG. 1, a pair of end plates, not shown, may also be provided one on each side of the rotor core 30 in the axial direction. Both sides of the rotor core 30 may be sandwiched by this pair of end plates. In this case, the squirt holes 42 are open farther to the outside in the axial direction than outer side surfaces of end plates.

The coil ends 22 may be fixed by varnish or the like, or they may be embedded in resin. Also, the rotor core 30 may be, formed by a powder magnetic core made by pressure forming magnetic powder. Also, a substance other than oil, such as cooling water, for example, may be used as the coolant.

The invention claimed is:

1. A cooling structure of a rotary electric machine that includes
   a rotating shaft, a rotor provided on the rotating shaft, and a stator that faces an outer periphery of the rotor and includes a coil end provided in an end portion of the stator in an axial direction of the rotating shaft, the cooling structure comprising
   a coolant passage that is included in the rotating shaft and through which coolant flows, wherein
   the coolant passage includes a squirt hole, of which an opening portion is positioned on an outer peripheral surface of the rotating shaft and is positioned at an outside of the coil end in the axial direction, and
   the squirt hole is configured to directly squirt the coolant to the coil end in an angle so that the coolant striking the coil end is distributed onto an outmost portion of the coil end in the axial direction and in a direction toward a center of the stator in the axial direction.

2. The cooling structure of the rotary electric machine according to claim 1, wherein the opening portion of the squirt hole is positioned farther from a center of the rotor in the axial direction than the coil end.

3. The cooling structure of the rotary electric machine according to claim 1, wherein the squirt hole is angled with respect to a direction orthogonal to the rotating shaft.

4. The cooling structure of the rotary electric machine according to claim 1, wherein the squirt hole points toward a corner portion.

5. The cooling structure of the rotary electric machine according to claim 1, wherein the squirt hole is configured to directly squirt the coolant to the coil end in an angle so that the coolant striking the coil end is distributed onto an outmost axial portion of the coil end in the axial direction and in a direction toward a center of the stator in the axial direction.

* * * * *